US009014087B2

(12) United States Patent
Gopalsamy et al.

(10) Patent No.: US 9,014,087 B2
(45) Date of Patent: Apr. 21, 2015

(54) METHOD AND SYSTEM FOR ACCESS POINT ASSISTED ACTIVE ROAM SCANNING

(75) Inventors: Anandakumar Gopalsamy, Tamilnadu (IN); Saravana Kumar Doraiswami, Tamilnadu (IN); Stalin Kumaravel, Bangalore (IN); Vivekananda Uppunda, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 205 days.

(21) Appl. No.: 13/336,182

(22) Filed: Dec. 23, 2011

(65) Prior Publication Data

US 2013/0165112 A1    Jun. 27, 2013

(51) Int. Cl.
  *H04W 4/00*    (2009.01)
  *H04B 7/00*    (2006.01)
  *H04W 8/02*    (2009.01)

(52) U.S. Cl.
  CPC ....................................... *H04W 8/02* (2013.01)

(58) Field of Classification Search
  USPC ......... 455/418–422.1, 432.1–444; 370/310.2, 370/328, 338, 352–356, 400, 401
  See application file for complete search history.

(56) References Cited

U.S. PATENT DOCUMENTS

| | | | |
|---|---|---|---|
| 2002/0188723 A1* | 12/2002 | Choi et al. | 709/225 |
| 2004/0039817 A1* | 2/2004 | Lee et al. | 709/225 |
| 2005/0037754 A1 | 2/2005 | Liu et al. | |
| 2005/0063334 A1 | 3/2005 | Fnu et al. | |
| 2006/0092888 A1 | 5/2006 | Jeong et al. | |
| 2008/0080388 A1* | 4/2008 | Dean et al. | 370/252 |
| 2008/0298333 A1* | 12/2008 | Seok | 370/338 |
| 2010/0027519 A1* | 2/2010 | Chen | 370/338 |
| 2012/0054172 A1* | 3/2012 | Agrawal et al. | 707/713 |

\* cited by examiner

*Primary Examiner* — San Htun

(57) ABSTRACT

A method and system for an access point assisted active roam scanning includes first and second access points, a switch and a client device. The switch communicates with the first and second access points that operate in a communication network, each access point having a respective operating area. The client device, within the first operating area, includes a wireless transceiver broadcasting first and second probe requests to the first and second access points, respectively, the second probe request being broadcast without receiving a probe response to the first probe request. The first and second access points generate first and second probe responses in response to receiving the first and second probe requests. The switch receives the first and second probe responses and generates a consolidated probe response as a function of the first and second probe responses.

14 Claims, 3 Drawing Sheets

METHOD AND SYSTEM FOR ACCESS POINT ASSISTED ACTIVE ROAM SCANNING

FIELD OF THE DISCLOSURE

The present disclosure relates generally to a mobile device roaming in a network and more particularly to access point assisted active roam scanning methods.

BACKGROUND

In an infrastructure network, an access point (AP) may be configured with a Basic Service Set (BSS). Further APs may also have respective BSSs with the combination thereof with the first access point creating an Extended Service Set (ESS). Initially, a client such as a mobile unit may be connected to one of the APs based on, for example, location. As the client moves, it is possible to move out of the BSS of the currently connected AP. That is, the client is moving out of the coverage area of the currently connected AP and moving into a coverage area of a different AP in the same ESS (i.e., roam). In such a case, the client starts a scanning process to find the APs in the environment and determine a more appropriate AP in which to connect.

Conventional methods of roam scanning include an active scan or a passive scan to find the appropriate AP in which to connect and determine a power at which the packets from each AP are received by the client. An active scan allows the client to actively change to a channel being scanned to broadcast a probe request and subsequently wait for a response. A passive scan allows the client to change to a channel being scanned and wait for a periodic beacon from an AP utilizing the channel. With an active scan, if the client wants to finish the scanning process quickly and the channel does not have any regulatory constraint, the client may start sending probe requests with a Service Set Identifier (SSID) in each channel and stay in the respective channel for a predetermined time to receive the probe responses from the APs. Through these probe responses from the APs, the client may choose a better AP and connect to it for a roam.

Despite active scanning being quicker than passive scanning, active scanning also takes a considerable amount of time. For example, if 13 channels are allowed in a particular country in the 802.11 b/g band and the client waits a predetermined amount of time in each channel during the active scan such as 20 ms, the client will spend 13×20 ms which is 260 ms spent for scanning alone. If all the supported bands are included for scanning, this time delay for scanning will still be higher. Conventional methods may restrict the client from scanning every channel and make the client only scan channels in which the APs of the ESS are configured. Such methods will still spend a predetermined amount of time based upon the number of channels to be scanned. In addition, a legacy method of active scanning includes a problem in that the number of probe responses received in a channel will be equal to the number of APs that hear the probe request sent by the client. Thus, if, for example, three APs in the same ESS are configured in a single channel and all hear the probe request, the number of probe responses received in that channel will also be three. Despite appearing insignificant, such a scanning may have a considerable effect on a channel with high data traffic. A further consideration for conventional methods includes the client choosing not to transmit or receive any data during the entire scan process. Still another consideration is the scanning process may entail scanning a single channel, returning to the home channel, transmit/receive data packets and go to a different channel for scanning. Regardless of the scanning being performed, the AP has to buffer the frames for the client during the scan and transmit them to the client once it comes back to the home channel. If any time critical data transmissions are in progress, even a 20 ms delay may be unaffordable for the client and the AP.

Accordingly, there is a need for a method and system for providing an active roam scanning that requires less time.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
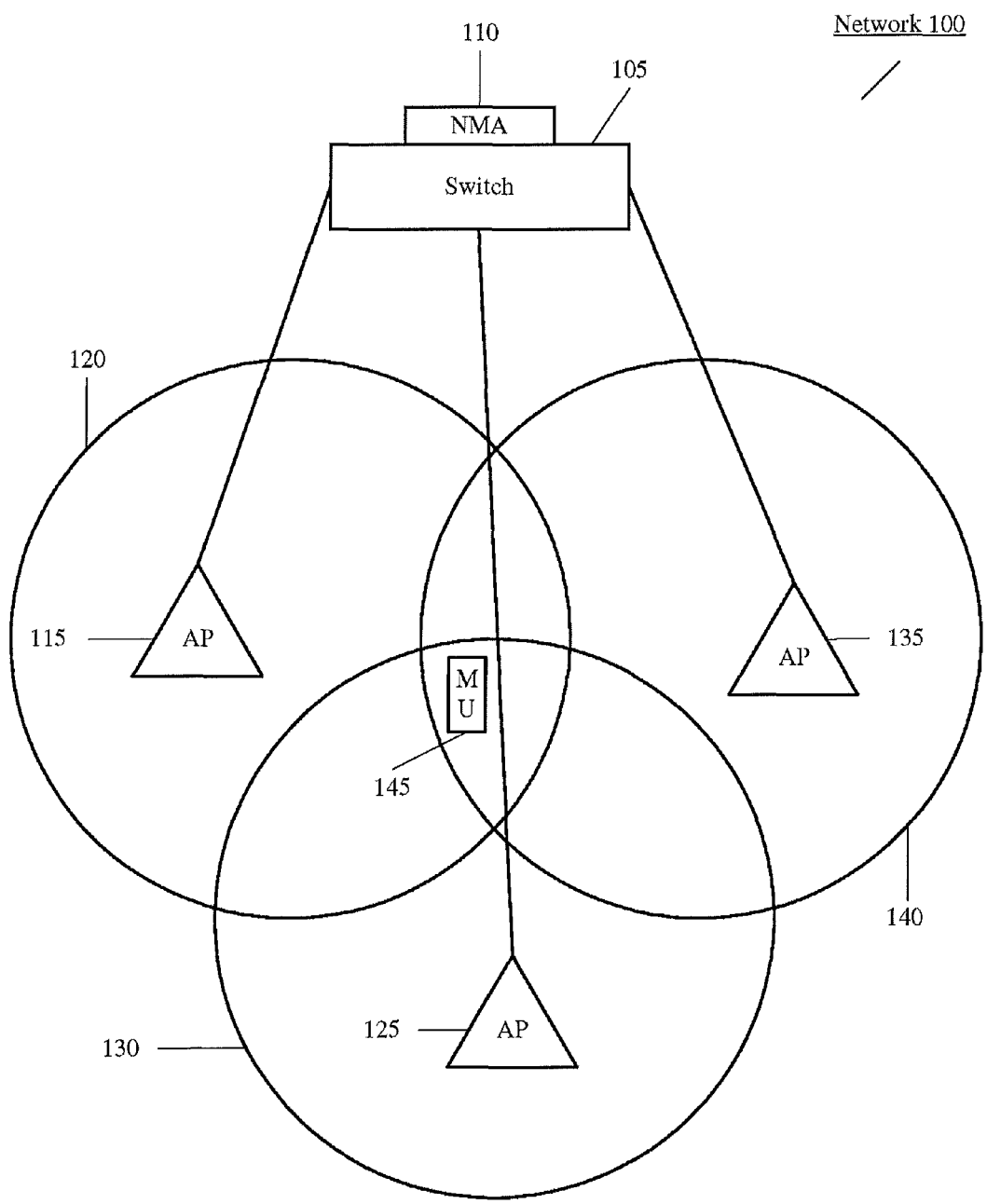
FIG. 1 is a block diagram of a network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and system for an access point assisted active roam scanning includes first and second access points, a switch and a client device. The switch communicates with the first and second access points that operate in a communication network, each access point having a respective operating area. The client device, within the first operating area, includes a wireless transceiver broadcasting first and second probe requests to the first and second access points, respectively, the second probe request being broadcast without receiving a probe response to the first probe request. The first and second access points generate first and second probe responses in response to receiving the first and second probe requests. The switch receives the first and second probe responses and generates a consolidated probe response as a function of the first and second probe responses.

The exemplary embodiments may be further understood with reference to the following description and the appended drawings, wherein like elements are referred to with the same reference numerals. The exemplary embodiments describe a system configured for an access point (AP) assisted active roam scanning. Specifically, when a client such as a mobile unit (MU) roams from a Basic Service Set (BSS) of a currently connected AP into an Extended Service Set (ESS), a switch in a network of the ESS consolidates probe responses and returns the consolidated probe responses to the client prior to the roam occurring. As will be described in further detail below, the client is not required to receive a probe response from each AP for a channel, thereby significantly decreasing a scanning time required. The currently connected AP, the further APs, the BSS, the ESS, the client, the switch, the probe requests/responses, and a related method will be discussed in further detail below.

FIG. 1 is a block diagram of a network 100 in accordance with an exemplary embodiment of the present invention. The network 100 may be any network format such as 802.11 b/g and may also be any type of network such as LAN, WLAN, VPN, etc. The network 100 may include a switch 105, a network management arrangement (NMA) 110, a plurality of access points (AP) 115, 125, 135, each AP including a respective operating area 120, 130, 140, and a client such as a mobile unit (MU) 145. It should be noted that the system 100 may include a variety of other conventional network components such as a database.

The switch 105 and the NMA 110 may provide conventional functionalities such as routing data (e.g., packets, voice, etc.) from one end point to another end point, from a network component to another network component, etc. According to the exemplary embodiments, the switch 105 may also provide a further feature regarding the active roam scanning. As will be described in further detail below, the switch 105 may be configured to receive probe responses from the APs and send a consolidated probe response containing information of individual probe responses from the APs for transmission back to the requesting client.

The APs 115, 125, and 135 may be network components that enable an expansion of the operating area available for a client that is disposed in the network 100. Accordingly, the AP 115 may have the operating area 120, the AP 125 may have the operating area 130, and the AP 135 may have the operating area 140. It should be noted that the use of three APs is only exemplary and the present invention may be adapted for a network that has more or fewer than three APs. The APs 115, 125, and 135 may each be configured with a Basic Service Set (BSS) for the respective operating area. Combined, the BSSs of the APs 115, 125, and 135 may create an Extended Service Set (ESS) so that a client that is disposed in the network 100 may roam from one operating area (e.g., operating area 120) into a neighboring operating area (e.g., operating area 130). The APs 115, 125, and 135 may allow for wired or wireless connectivity with end points disposed in the respective operating areas. The APs 115, 125, and 135 may also be connected with a wired connection to the switch 105.

The MU 145 may be any mobile device configured to connect to the network 100. For example, the MU 145 may include a wireless transceiver configured to transmit and receive data with the AP 115 as shown in FIG. 1. The MU 145 may also be configured to process probe responses from APs in which the MU 145 is not currently connected to determine a subsequent connection to be made should the MU 145 move toward a periphery of the operating area of the connected AP. That is, when the MU 145 moves out of the BSS of the currently connected AP (e.g., AP 115), the MU 145 may include a processor that is configured to determine the AP to connect in the ESS when a roam is to occur. As will be discussed in further detail below, the MU 145 may determine the roaming AP based upon the consolidated probe responses from the switch 105 that were gathered from the APs that provided a probe response to a probe request transmitted by the MU 145.

According to the exemplary embodiments of the present invention, the MU 145 may perform an active roam scanning that is assisted by the APs of the ESS for the network 100. Clients such as the MU 145 may be operating in infrastructure mode and the APs 115, 125, 135 have a wired connection to the switch 105 to form the ESS. When the active roam scanning is performed, the client may already be configured with the channel of the AP in which the client is currently connected. The client may send an initial probe request to this AP. Prior to any response to the request, the client may then switch to another channel of an AP in the ESS. The client may send another probe request to this AP. Once a probe request has been transmitted at each authorized channel of the ESS, the client may return to the home channel, again without waiting for probe responses. The APs that receive the probe request from the client may send the probe responses to the switch through the wired connection. The switch may then consolidate the probe responses and send the consolidated probe responses to the currently connected AP of the client. The currently connected AP may forward the consolidated probe responses to the client. The client may determine the AP in which to roam based upon the consolidated probe responses. For example, the RX power at which the APs received the probe request may be a primary factor to choose a better AP and roam to it. This process will be described in further detail below with reference to FIG. 2.

Figure 2:
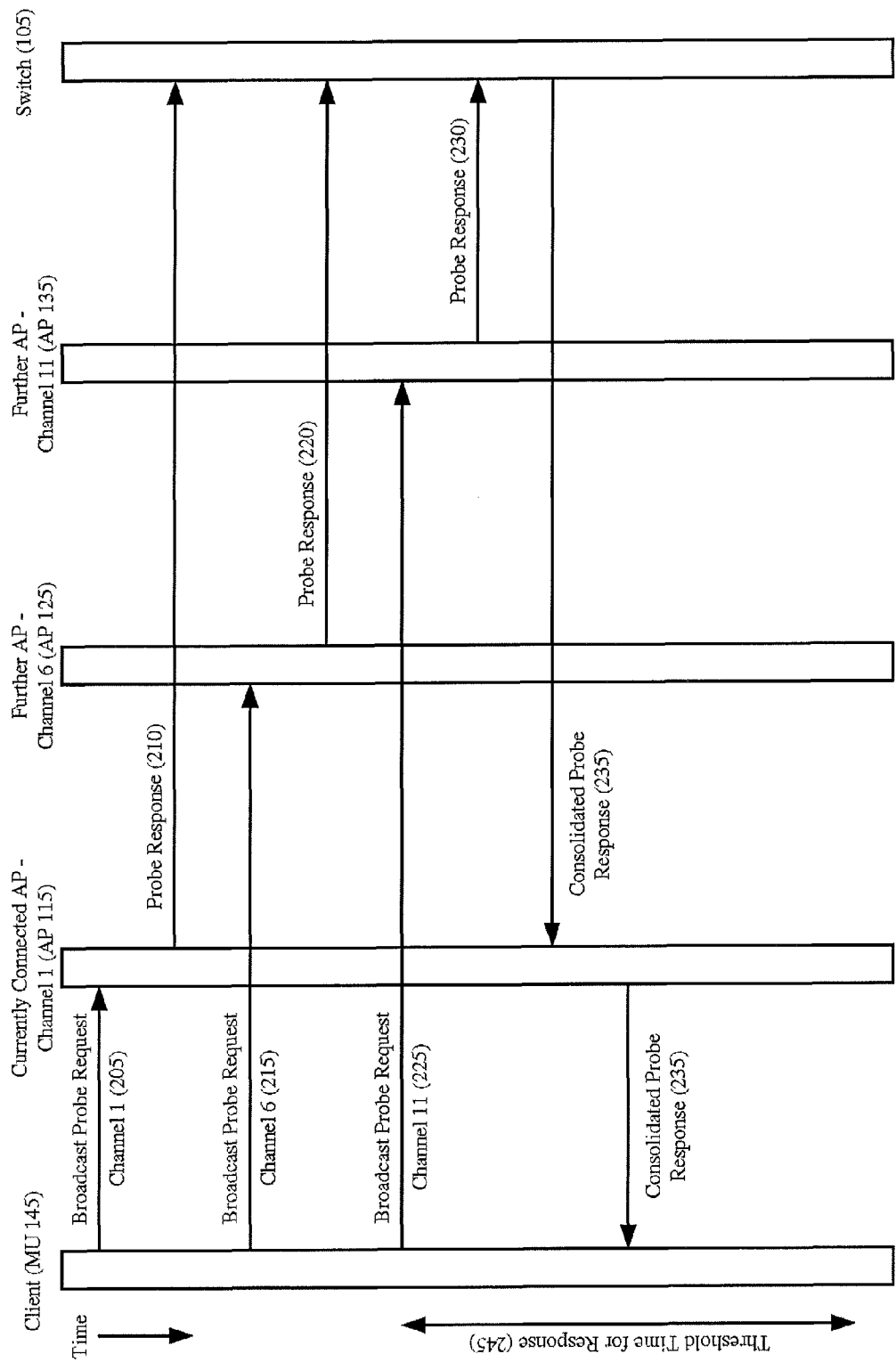
FIG. 2 is an active roam scanning for the network of FIG. 1 as a factor of time in accordance with some embodiments.

FIG. 2 is an active roam scanning for the network 100 of FIG. 1 as a factor of time in accordance with some embodiments. Thus, the active roam scanning of FIG. 2 will be described with reference to the network 100, the components therein, and the MU 145 of FIG. 1.

The client or MU 145 may initially send a probe request with the Service Set Identifier (SSID) on the channel of the currently connected AP. For example, as illustrated in FIG. 1, the MU 145 may be connected to the AP 115. The AP 115 may operate on the channel 1. Thus, the MU 145 may broadcast the probe request 205 on channel 1 at a first point in time. It should be noted that the broadcasting of the probe request on a particular channel may be received only by a particular AP. However, as discussed above and as those skilled in the art will understand, the channel may be used by more than one AP. Thus, each AP operating in the channel may receive the probe request.

With regard to the client side (e.g., MU 145), upon sending the probe request 205 on channel 1 to the currently connected AP 115, the MU 145 switches to the next channel without waiting for the probe response. Thus, as illustrated in FIG. 2, the MU 145 may broadcast a probe request 215 on channel 6 to the AP 125 (or any other AP that operates in channel 6). Again, without waiting for the probe response, the MU 145 switches to the next channel and broadcasts the probe request 225 on channel 11 to the AP 135 (or any other AP that operates in channel 11). In this way, the client switches to each channel and sends a probe request with a new sub-element called "Request for Consolidated Probe Response" in the vendor specific element. That is, each probe request 205, 215, and 225 that was broadcast by the MU 145 includes this further sub-element. Upon broadcasting the final probe request, the MU 145 returns to the home channel and continues with its normal operation. A threshold timer 245 is also initiated upon broadcasting the final probe request. The threshold timer 245 will be discussed in further detail below.

With regard to the AP side (e.g., AP 115, 125, 135), upon receiving the probe request from the client (e.g., MU 145), each AP may verify whether the sub-element "Request for Consolidated Probe Response" is present inside the vendor specific element. If the sub-element is not present, the AP may perform the conventional probe response. However, if the sub-element is present, the AP will not send the probe response back the client. Instead, the AP will measure the power (e.g., RSSI) at which the probe request was received. The AP may subsequently send a probe response, the measured power, the channel number as well as other elements such as supported rates to the switch. As illustrated in FIG. 2, the AP 115 may send the probe response 210 (along with the other listed items) to the switch 110; the AP 125 may send the probe response 220 (along with the other listed items) to the switch 110; and the AP 135 may send the probe response 230 (along with the other listed items) to the switch 110. Also, as illustrated in FIG. 2, the time at which the probe response is sent by the AP may be between two subsequent probe requests broadcast by the MU 145. However, it should be noted that this timing is only exemplary and the probe responses being forwarded to the switch 105 by the AP may occur at any time but must occur subsequent to receiving the probe request. The format in which the AP sends the details (e.g., probe response, measured power, channel) to the switch 105 is internal to the AP and the switch.

With regard to the switch 105, upon receiving the probe responses from the APs 115, 125, 135, the switch consolidates all the probe responses and sends the consolidated probe responses 235 to the currently connected AP 115 which forwards the consolidated probe responses 235 to the client or MU 145. For the switch 105 to properly consolidate the probe responses 210, 220, 230 for the client, each AP which heard the probe request and forwards the probe response also sends the MAC address of the client sending the probe request. Thus, the client 105 is capable of determining whether the probe responses 210, 220, 230 from the APs 115, 125, 135, respectively, relate to the MU 145. While consolidating the probe responses received from the APs, the switch 105 may also include the BSS identification (BSSID) of the respective AP along with the other details. The switch 105 may use the client's MAC address to consolidate the probe responses for a particular client and to find out the AP to which the client is currently connected. The details in the consolidated probe response 235 may be sent to the client using a probe response frame or an action frame. Based on the size of the probe responses, the AP may decide to fragment the details and send them to the switch through multiple frames. The switch 105 may consolidate the entire probe response frames from the AP or it may consolidate only the selected details from each probe response from the AP. This option may be determined by the administrator or other further factors such as traffic. However, in a preferred embodiment, the consolidated probe response 235 sent to the MU 145 is in a single frame.

Returning to the client side and as discussed above with the threshold timer 245, once the client returns to its home channel and continues its normal operations, the threshold timer 245 is initiated. The threshold timer 245 is a predetermined length of time set for receiving the consolidated probe response 235 from the switch 105 through the currently connected AP 115. If the consolidated probe response 235 is received within the threshold timer 245, the client may select an AP by comparing the data contained therein such as the RX power in which the probe request was received by each AP and other capabilities of the AP. In a preferred embodiment of the present invention, the RX power may be a primary factor in the determination of the optimal AP.

During the selection process by the MU 145, the client may also receive the BSSID and the channel number of the APs from the details in the consolidated probe response 235 by the switch 105. Thus, the client may switch to the particular channel of the selected AP in which to roam and start a connection process. If required, the client may also send a directed probe request to the chosen AP to confirm its presence. As discussed above, this directed probe request may omit the sub-element so that the MU 145 waits for a probe response from the AP prior to changing channels.

To differentiate clients using the exemplary embodiments of the present invention, the probe request may include the sub-element "Request for Consolidated Probe Response" in a vendor specific information element or a proprietary element. Including this sub-element in the probe request may indicate the infrastructure that the client will handle the consolidated probe response to be sent by the currently connected AP. If the client wishes to receive certain specified elements in the probe response from the AP through the consolidated probe response, a further element "Request Information" may also be included in the probe request frame. APs receiving the probe request will therefore include the requested elements in the report sent to the switch. The switch in turn includes these elements when forwarding the consolidated probe response. The switch may also use either a probe response frame with a vendor specific element or other proprietary element or a vendor specific action frame to send the consolidated frame response details to the client.

Figure 3:
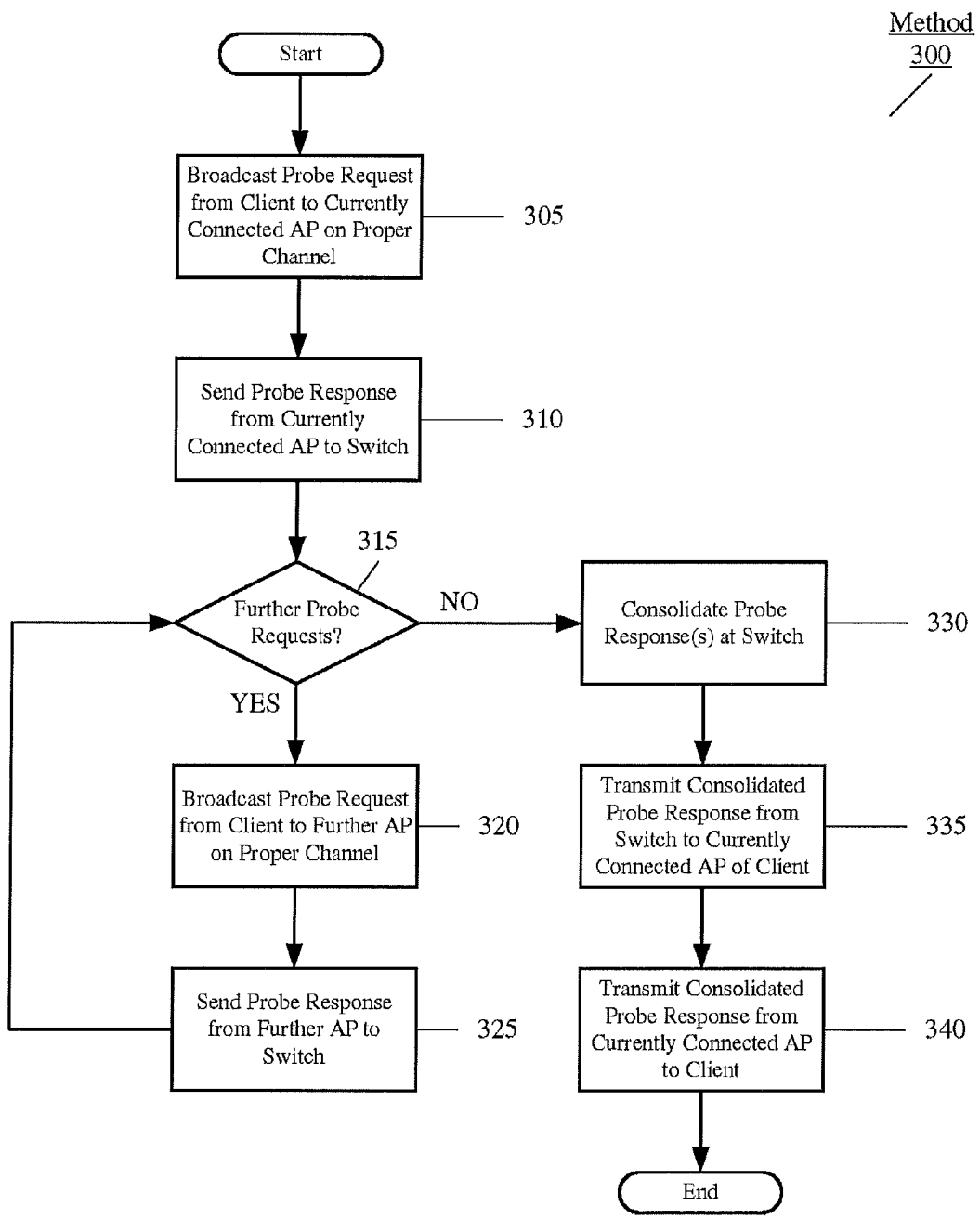
FIG. 3 is a flowchart of a method for active roam scanning in accordance with some embodiments.

FIG. 3 is a flowchart of a method 300 for active roam scanning in accordance with some embodiments. The method 400 will be described with reference to the network 100 of FIG. 1 and its components as well as the active roam scanning process of FIG. 2.

In step 305, the client or MU 145 broadcasts a probe request to a currently connected AP such as the AP 115 on the designated channel. As discussed above, since the MU 145 may already be connected to the AP 115, the MU 145 may already be operating on the appropriate channel. Thus, the MU 145 may broadcast the probe request 205 to the AP 115. As discussed above, the probe request 205 may include the sub-element "Request for Consolidated Probe Response." Upon receiving the probe request 205 from the MU 145, the AP 115 may send the probe response 210 to the switch 105 as noted in step 310. As discussed above, the probe response 210 may include a variety of different data such as a MAC address, a measure power at which the probe request was received, an operating channel of the AP 115, etc. The probe response 210 may also include further data based upon the "Request Information" sub-element that may be included in the probe request 205.

In step 315, a determination is made whether further probe requests should be broadcast by the MU 145. As discussed above, the network 100 may include an ESS in which further APs are disposed in the network 100. If further probe requests are to be broadcast, the method 300 continues to step 320 where the further probe request is broadcast on the appropriate channel. As described above, the probe request 215 may be broadcast to the AP 125 on channel 6. The AP 125 will in turn send a probe response 220 to the switch 105 as noted in step 325. The method 300 returns to step 315 where another determination is made. As described above, the probe request 225 may be broadcast to the AP 135 on the appropriate channel. As described above, the probe request 225 may be broadcast to the AP 135 on channel 11. The AP 135 will in turn send a probe response 220 to the switch 105. When all further probe requests have been broadcast, the method 300 returns to step 315 where the determination made is that no further probe requests are to be broadcast. Again, the MU 145 may switch to the appropriate channels prior to any response from the request.

The method 300 may include a further step at this point in which the MU 145 initiates the threshold timer 245. As discussed above, the threshold timer 245 may indicate a period of time that the MU 145 waits for the consolidated probe response from the switch 105. Also as discussed above, steps 305 and 320 may be performed without waiting for any response to be received by the MU 145. In addition, steps 310 and 325 may occur at any time subsequent to the receiving of the probe request.

In step 330, the switch 105 receives the probe responses from the APs and consolidates them. As discussed above, the switch 105 may receive the probe responses including a variety of different data that is mandatory with the sub-element "Request for Consolidated Probe Response" frame and/or optional with the sub-element "Request Information" frame. Also as discussed above, the switch 105 may receive the probe response from the AP in fragments or wholly. The switch 105 may gather the fragments to consolidate the probe response at this time.

In step 335, the switch 105 transmits the consolidated probe response 235 to the currently connected AP of the client. As shown in FIGS. 1 and 2, the switch 105 may transmit the consolidated probe response 235 to the AP 115. In step 340, the currently connected AP may forward the consolidated probe response 235 to the client. As discussed above, if the method 300 includes the initiation of the threshold timer 245, the method 300 may include a further step for a determination of whether the consolidated probe response 235 was received within the threshold timer 245. Upon receiving the consolidated probe response 235, the MU 145 may determine the optimal AP in which to connect, for example, through comparison of RX power measurements.

The client may also include a further parameter in the probe requests 205, 215, 225 such as the duration for which it is intending to spend in scanning all the channels. This duration may be calculated based on the number of channels to be scanned, multiplied by the maximum duration required to send a probe request on air. In each probe request sent out, the client may recalculate the scanning duration based on the remaining number of channels to be scanned and send it. The scanning duration sent from the client may also be included in the probe responses 210, 220, and 230 that are sent from the APs, 115, 125 and 135 to the switch 105.

Upon receiving the probe responses 210, 220, and 230, the switch 105 may decide the maximum duration it has to wait for receiving all the probe responses from the APs. The switch 105 may calculate the waiting time by adding a delay for receiving probe responses from the APs to the scanning time sent by the client. As the switch 105 is aware of all the APs configured in a particular ESS, it may decide the waiting time based on the number of APs.

It should be noted that the method 300 may include further steps. As discussed above, upon the MU 145 determining the optimal AP to roam, the MU 145 may send a conventional probe request to confirm the presence of the selected AP. Thus, the method 300 may include an additional step after step 340 in which the conventional probe request is sent. This probe request may be sent as a broadcast or sent directly to a selected AP. Subsequently, a determination may be made whether a probe response is received. If received, the MU 145 may roam accordingly. If not received, the MU 145 may make another determination as to the optimal AP in which to roam and perform another conventional probe request/response procedure.

The exemplary embodiments of the present invention provide a system and method for an active roam scanning. By broadcasting all probe requests on designated channels without waiting for a response, the client may return to a home channel to continue normal operations while the APs and switch provide the necessary data to determine the optimal AP in which to connect. Through the method described above, the time for which the client is away from the home channel will be significantly less. Based upon the time required by the switch to receive reports from the APs and consolidate them, time taken to complete an active scan may be lesser than that of legacy active scanning methods. As the APs will communicate to the switch through a wired connection, the time required to get probe responses in the switch should be significantly lesser than the time required to receive probe responses in the client through air interface. Also, the client need not wait on a channel for a fixed amount of time to receive probe responses. As the APs are not sending the probe responses directly to the client, bandwidth utilization in the channels will be improved as well. In addition, rogue APs may also be detected since genuine APs will not respond to probe requests that include the sub-element "Request for Consolidated Probe Response" in a vendor specific element. Rogue APs will respond to probe requests as they will not be able to understand the request included in the vendor specific element.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system, comprising:
   a plurality of access points operable in a communication network and each of the plurality of access points having an operating area;
   a switch configured for communicating with the plurality of access points, the switch being configured to provide no access point functionality; and
   a client device situated within a first operating area of a first access point of the plurality of access points, the client device including a wireless transceiver configured to broadcast a probe request to each of the plurality of access points, wherein the probe request includes a sub-element data to indicate to each of the plurality of access points that a respective probe response is to be sent to the switch, and wherein the probe requests include a time duration data related to a total duration allocated to receive a consolidated probe response and wherein the time duration data included in the probe request is a difference between the total duration and a time related to the duration data,
   wherein the switch is configured to receive probe responses generated by each of the plurality of access points in response to receiving the probe request, wherein the probe responses include the time duration data,
   wherein the switch is operable to determine a waiting time to receive all probe responses sent from access points as a function of the time duration data, to generate the consolidated probe response as a function of the received probe responses, and to transmit the consolidated probe response to the first access point which operates to forward the consolidated probe response to the client device.

2. The system of claim 1, wherein the consolidated probe response includes roaming data, the client device determining an optimal access point from access points that transmitted one of the probe responses as a function of the roaming data.

3. The system of claim 2, wherein the roaming data includes a measured power at which each of the plurality of access points received the probe requests.

4. The system of claim 1, wherein the probe responses include a media access control (MAC) address of the client device.

5. The system of claim 1, wherein the client device transmits a further probe request to the optimal access point, and wherein the client device connects to the optimal access point in response to receiving a further probe response from the optimal access point to confirm a presence of the optimal access point.

6. The system of claim 1, wherein at least one of the received probe responses and the consolidated probe response includes a channel number in which the plurality of access points respectively operate.

7. The system of claim 1, wherein the client device broadcasts the probe request to each of the plurality of access points without receiving a probe response to the probe request.

8. A method, comprising:
   broadcasting, by a client device situated within a first operating area of a first access point, a probe request to a plurality of access points operating in a communication network and having corresponding operating areas, wherein the probe request includes a sub-element data to indicate to each of the plurality of access points that a respective probe response is to be sent to a switch communicating with the plurality of access points, the switch having no access point functionality, and wherein the probe requests include a time duration data related to a total duration allocated to receive a consolidated probe response and wherein the time duration data included in the probe request is a difference between the total duration and a time related to the duration data;
   transmitting a probe response include the time duration data from each of the plurality of access points, in response to receiving the probe request, to the switch;
   determining, by the switch, a waiting time to receive all probe responses sent from access points as a function of the time duration data;
   generating, by the switch, the consolidated probe response as a function of the received probe responses; and
   transmitting, by the switch, the consolidated probe response to the first access point and forwarding the consolidated probe response to the client device.

9. The method of claim 8, wherein the consolidated probe response includes roaming data, the client device determining an optimal access point from access points that transmitted one of the probe responses as a function of the roaming data.

10. The method of claim 9, wherein the roaming data includes a measured received power at which each of the plurality of access points received the probe requests.

11. The method of claim 8, further comprising:
transmitting a further probe request to the optimal access point; and
connecting, by the client device, to the optimal access point in response to receiving a further probe response from the optimal access point to confirm a presence of the optimal access point.

12. The method of claim 8, wherein the client device broadcasts the probe request to each of the plurality of access points without receiving a probe response to the probe request.

13. A device, comprising:
a processor;
a memory; and
a wireless transceiver configured to broadcast a probe request on a plurality of channels, the plurality of channels relating to a plurality of access points, wherein the probe request includes a sub-element data to indicate to each of the plurality of access points that a respective probe response is to be sent to a switch configured to communicate with the plurality of access points, the switch having no access point functionality, and wherein the probe requests include a time duration data related to a total duration allocated to receive a consolidated probe response and wherein the time duration data included in the probe request is a difference between the total duration and a time related to the duration data,
wherein the wireless transceiver is further configured to receive a consolidated probe response from the switch, wherein the probe responses include the time duration data, the switch determining a waiting time to receive all probe responses sent from access points as a function of the time duration data and generating the consolidated probe response in response to receiving a probe response from each of the plurality of access points, the probe response include the time duration data being generated by each of the plurality of access points in response to receiving the probe request.

14. The device of claim 13, wherein the wireless transceiver broadcasts the probe request on each of the plurality of channels without receiving a probe response to the probe request.

* * * * *